Figure 1:
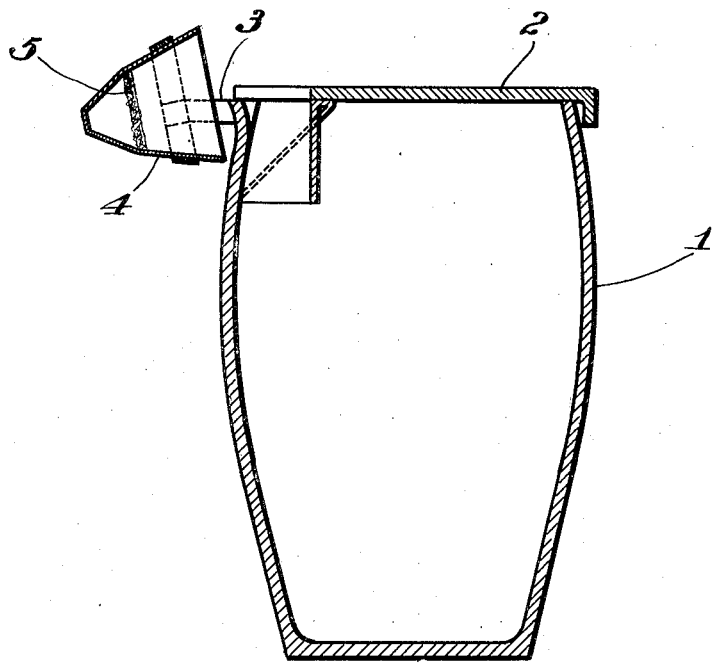

April 23, 1929.  H. E. BAKKEN  1,710,398

METHOD OF PURIFYING LIGHT METALS

Filed July 21, 1926

WITNESSES

INVENTOR

Patented Apr. 23, 1929.

1,710,398

UNITED STATES PATENT OFFICE.

HERMAN E. BAKKEN, OF NIAGARA FALLS, NEW YORK, ASSIGNOR TO AMERICAN MAGNESIUM CORPORATION, OF NIAGARA FALLS, NEW YORK, A CORPORATION OF NEW YORK.

METHOD OF PURIFYING LIGHT METALS.

Application filed July 21, 1926. Serial No. 123,855.

The object of this invention is to provide a simple, effective, and practical method of removing solid, or partially solid impurities entrained in light metals, by which is meant metals, such as magnesium and aluminum, which are so light in weight that impurities of the character stated largely remain immersed in the body of the metal, rather than segregate upon its upper surface as in the case of heavy metal such as iron or steel.

In the case of magnesium, to the purification of which this invention is especially applicable, it is well known that it readily burns at elevated temperatures, and even below its melting point. The entrained oxides and nitrides so produced are largely present in the form of insoluble films, and they, as well as miscellaneous impurities in the form of dross, distribute themselves throughout the body of the metal when molten, and, unless removed, may seriously impair the physical properties of the solid metal. Magnesium may be separated from these impurities by sublimation as disclosed in my co-pending application Serial No. 598,292, filed November 1, 1922, but when the sublimed metal is reheated or re-melted in the presence of air, further non-metallic inclusions are again introduced.

In a similar way, insoluble films of aluminum oxide, and more or less solid particles of dross may be formed and distributed throughout the body of molten aluminum and aluminum alloy, and thus impair the physical properties of the metal.

The elimination or removal of these occluded impurities, and the consequent production of light metals free from the deleterious segregations which they form, has continually confronted manufacturers for many years. I have discovered, and it is upon this discovery that my invention is based, that occluded insoluble impurities found in light metals, can, without in any way prejudicially affecting the metal, be economically and rapidly removed by filtering the metal in a molten state through a porous mass of metal having a melting point substantially higher than that of the light metals, and which is not dissolved by them. While the porous metallic filter mass may take various forms, such as steel shot or irregularly formed small bodies of iron, steel or other high melting point metals, it preferably takes the form of fine strands of metal. These may be in the form of a plurality of superimposed webs of fine wire screen, although the preferred specific form of porous mass of filtering metal, is a body of what is commercially known as steel wool.

While it would ordinarily be supposed that the interstices of a mass of steel wool are so large that it could not be used as a filtering medium, I have found that when molten magnesium is poured through a loosely packed pad of steel wool the objectionable impurities become enmeshed in, and adhere to, and are retained by the pad, while the purified metal flows freely and quite rapidly throught it. In fact its flow through the pad is so rapid that there is but little retardation as compared to the normal flow of a stream of metal from a crucible, pot or other container. The occluded impurities appear to be largely present as films, and also take the form of string-like pieces, lumps or scales which are readily retained by the pad.

In order to prevent, or to keep to a minimum the introduction of impurities in the molten metal or alloy, it is essential that the material comprising the filtering medium shall substantially resist attack by the metal which is filtered. For this purpose the filter pad is preferably provided with a solution-resistant coating, that is to say with a coating such as will resist solution and erosion of the pad by the liquid metal passed through it. Steel wool is normally covered with an oxide film which makes it quite resistant to this solution, or erosion effect, and which makes it eminently suitable for use in practicing my invention.

It may be desirable in some cases, however, to increase the resistance, and to this end the metal may be allowed to rust, thus building up a thicker oxide coating. In the case of aluminum or its alloys a resistant coating may be formed by giving the pad and funnel a lime wash, as is commonly done with iron and steel objects to protect them from attack by molten aluminum. After coating they are of course thoroughly dried.

The invention may be further explained by reference to the accompanying drawing which shows an apparatus by the use of which the method has been successfully practiced on a commercial scale. In the drawing, Fig. 1 is a vertical central sectional view of a melting crucible having attached to it a pouring funnel provided with a filter, and Fig. 2 a plan view of the filter.

Figure 2:
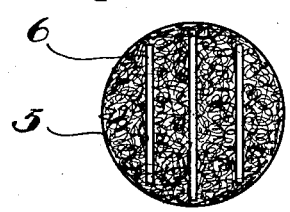

When molten light metal, such as magnesium, is poured directly from a melting crucible into the molds, a crucible 1 may be provided with a cover 2 having attached to it, as by straps 3, a pouring funnel 4 arranged adjacent to the pouring lip of the crucible, the funnel being provided with a filter pad 5. The thickness of the pad will, of course, vary with the size of the funnel and with the quantity of metal to be filtered. By way of example, and not of limitation, I have found that a suitable filter pad for a pouring funnel such as shown in Fig. 1 is a pad of No. 3 steel wool three-eighths of an inch in thickness and weighing about one-quarter of an ounce. To give the pad stability, it may be reinforced with iron rods 6 as shown in Fig. 2, the rods being one-eighth inch in diameter. In case the filtering pad 5 becomes clogged with impurities during the pouring of metal from the crucible, the pouring may be discontinued for the brief time necessary to remove the pad and replace it with a fresh one.

In carrying out the improved method of purifying light metals, it may in some instances be necessary to preheat the filtering pad and the pouring funnel or other device in which the pad may be placed. However, when the filtering medium is steel wool, the pad is so small and its thermal capacity is so low that no preliminary heating has been found necessary. Because of the small size, and the open mesh character of a filter pad of steel wool, a very small amount of good metal is retained on the pad mixed with the impurities at the end of the filtering operation. In some cases, such small amounts as are retained can be readily recovered if desired.

In the practice of the process it has been found that the metal flows quite rapidly through the filter pad, that its occluded impurities are effectively removed without in any way seriously retarding the metal flow, and at a very low cost.

According to the provisions of the patent statutes, I have described the principle and mode of operation of my invention, and have given a specific example of the manner in which it may be practiced. However, I desire to have it understood that, within the scope of the appended claims, it may be practiced otherwise than as specifically described and illustrated.

I claim as my invention:

1. The method of removing entrained impurities from a readily oxidizable light metal, comprising passing the metal in a liquid state through a porous mass of metal substantially insoluble in the molten metal, the impurities being retained by the porous mass.

2. The method of removing entrained impurities from a readily oxidizable light metal, comprising pass the metal in a liquid state through a body of strands of metal which is substantially insoluble in the molten metal, the impurities being retained by the strands of metal.

3. The method of removing entrained impurities from a readily oxidizable light metal, comprising passing the metal in a liquid state through a porous mass of metal having an erosion-resisting coating, the impurities being retained by the porous mass.

4. The method of removing entrained impurities from a readily oxidizable light metal, comprising passing the metal in a liquid state through a body of steel wool by which the impurities are retained.

5. The method of removing entrained impurities from a readily oxidizable light metal, comprising passing the metal in a liquid state through a body of steel wool having an oxide coating formed on it, the impurities being retained by the steel wool.

6. The method of removing entrained impurities from magnesium, comprising passing molten magnesium through a porous mass of metal substantially insoluble in the magnesium, the impurities being retained by the porous mass.

7. The method of removing entrained impurities from magnesium, comprising passing molten magnesium through a body composed of strands of metal which is substantially insoluble in magnesium, the impurities being retained by the strands of metal.

8. The method of removing entrained impurities from magnesium, comprising passing molten magnesium through a porous mass of metal having an erosion-resisting coating, the impurities being retained by the porous mass.

9. The method of removing entrained impurities from magnesium, comprising passing molten magnesium through a body of steel wool on which the impurities are retained.

10. The method of removing entrained impurities from magnesium, comprising passing molten magnesium through a body of steel wool having an oxide coating formed on it, the impurities being retained by the steel wool.

In testimony whereof, I sign my name.

HERMAN E. BAKKEN.